United States Patent
Hoyt et al.

[15] 3,674,982
[45] July 4, 1972

[54] ZONE CONTROLLED COOK OVEN

[72] Inventors: Edwin D. Hoyt, Hemet; Luther Welsh, Riverside, both of Calif.

[73] Assignee: Rama Industrial Heater Co., San Jacintom, Calif.

[22] Filed: Nov. 9, 1970

[21] Appl. No.: 87,772

[52] U.S. Cl. .................................. 219/403, 219/400, 219/413
[51] Int. Cl. ................................................................. F27d 11/02
[58] Field of Search ................... 219/403, 413, 412, 400, 395, 219/402

[56] References Cited

UNITED STATES PATENTS

| | | | |
|---|---|---|---|
| 2,683,795 | 7/1954 | Scheidler et al. | 219/403 X |
| 2,174,079 | 9/1939 | Dadson | 219/403 |
| 2,415,768 | 2/1947 | Shaw | 219/402 |
| 2,994,760 | 8/1961 | Pecoraro et al. | 219/413 X |
| 3,030,486 | 4/1962 | Lashley | 219/413 X |
| 3,368,062 | 2/1968 | Gramenius et al. | 219/400 |

Primary Examiner—Volodymyr Y. Mayewsky
Attorney—Georges A. Maxwell

[57] ABSTRACT

An oven for heating a plurality of individual prepared and refrigerated meals and comprising an insulated cabinet with an access door, a plurality of vertically spaced support shelves in the cabinet, the perimeters of which are spaced from adjacent walls of the cabinet, each shelf adapted to support a number of plates or trays on which the prepared meals are deposited and comprising a flat imperforate shelf-plate of metal having a high modulus of heat conductivity, resistance heater units engaged within the shelf-plates and heat control means related to each shelf-plate and including an elongate heat sensing device within and substantially coextensive with the major dimension of the shelf-plate.

6 Claims, 9 Drawing Figures

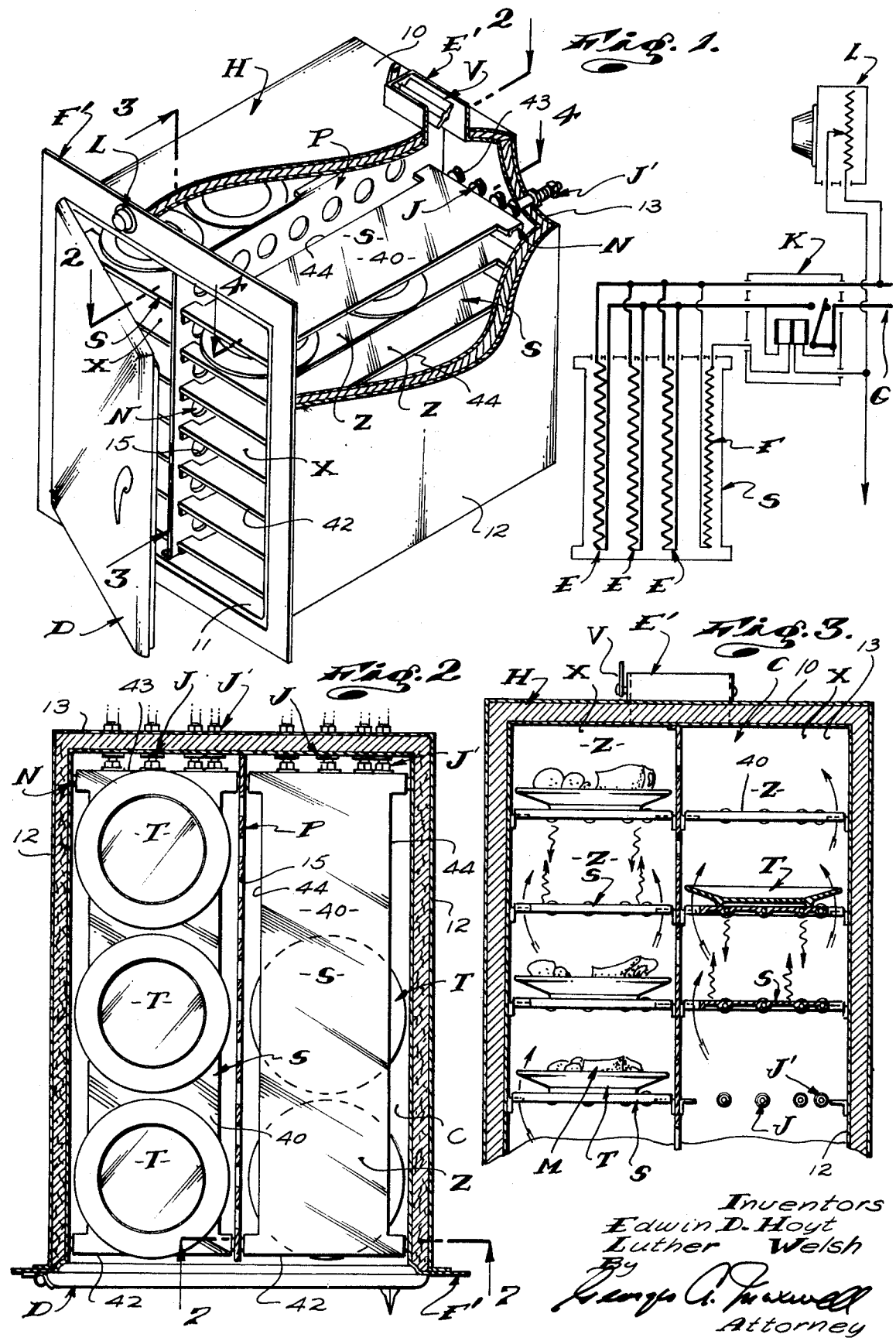

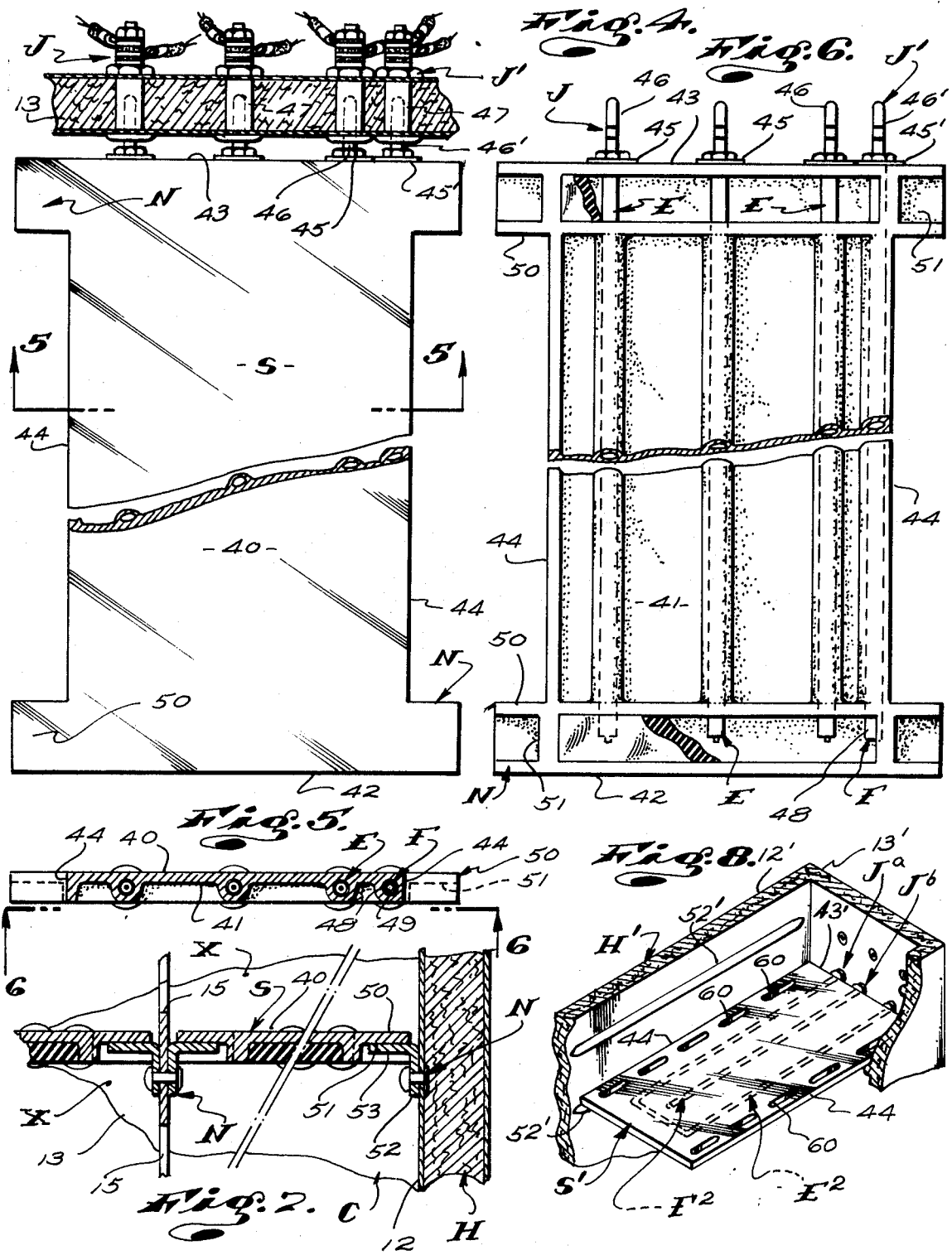

ZONE CONTROLLED COOK OVEN

This invention has to do with a cook oven and is more particularly concerned with a novel and improved oven construction which is particularly adapted to quickly, continuously and uniformly heat and/or cook frozen and/or refrigerated dishes or trays or prepared food stuffs which are placed in and removed from the oven in a substantially continuous, random manner.

In the air transportation industry, it is common practice to serve the passengers of passenger aircraft one or more warm or hot meals on flights which extend any appreciable time.

In carrying out the above practice, special meals are prepared in kitchen facilities at the airport of embarkation. These meals are established in individual servings on plates or on trays for subsequent transfer onto plates. Such meals generally are refrigerated, and in many instances, frozen at the ground facilities kitchen.

PRior to take off of a particular flight, a suitable number of the above noted refrigerated and/or frozen meals are delivered to the aircraft and are stored in refrigerated storage compartments.

As a general rule, the passengers are provided with a menu which presents a number, generally three or four, different means, any one of which each passenger can select.

At an appropriate time during the flight, the flight stewardesses obtain the meal orders from passengers, remove the appropriate or ordered refrigerated meals from the storage compartment and place them in an electric oven provided in the aircraft for heating and/or cooking the meals.

When the meals are heated and/or cooked, they are removed from the oven and served to the passengers.

In order that the above procedure can be effectively carried out, it is necessary that the stewardess receive the orders for the several meals in some special and uniform or orderly manner (such as in the same uniform order in which the seats of the aircraft are numbered) and place the meals in the oven in a corresponding or appropriate manner so that they can, when heated and readied for serving, be suitably identified with the passengers for whom they are intended, and promptly and properly served.

The typical electric oven provided by the prior art for use in aircraft to heat and/or cook the prepared and refrigerated meals which are dispensed to the passengers of such craft, includes simple heat insulated metal box-like cabinets with access doors, resistance heater units at and adjacent to the top and bottom walls of the cabinets, a plurality of vertically spaced wire racks within the cabinets and on which the plates or trays of food are deposited or set and control means to control the heat in the cabinets and which normally include a single heat sensing device in the uppermost portion of the cabinets.

It is to be noted that the above type of oven construction operates on the premise that the mean temperature throughout the oven is and will be maintained uniform and that upon placing a multitude of refrigerated or frozen meals on the racks in the oven, they will all be heated uniformly.

It will be readily seen that the above premise is not correct and that upon introducing a group of such meals in such an oven, which has been pre-heated, the mean temperature in the oven is immediately lowered and the heating elements at the upper and lower sides of the oven are immediately energized to again heat and seek to re-establish the desired mean oven temperature. When the above takes place, the meals closest to or immediately adjacent the heater elements are heated rapidly and the meals more remote from the elements or heat sources are heated less rapidly in substantial direct ratio with the distance they are spaced from the heater elements and/or by the numbers of other meals which are interposed therebetween.

As a result of the above, it is not uncommon that when the meals are to be served some are overcooked and others are not even thoroughly defrosted or thawed out.

It is frequently happens that the bottom sides of the lowermost meals and the top sides of the uppermost meals, or those sides of the meals adjacent and opposing the heat sources are burned before their sides remote from said heat sources are heated sufficiently to be palatable.

To complicate the above and to aggrevate the problems presented, the several different kinds of meals which are heated are frequently mixed; that is, meals with beef and potatoes which heat slowly are frequently arranged throughout the oven adjacent to meals with fish and light vegetables which heat relatively rapidly.

In efforts to overcome the above noted differences, attempts are made to time the depositing of the meals into the ovens and to arrange the meals in some special and predetermined order therein so that all the meals will be heated properly and be ready for serving at about the same and desired time. Such practices are unsure and require the exercise of great and special skill if they are to prove effective. Further, such practices inhibit the ability to place the meals in the ovens in a sequence compatible with the order in which they might be most efficiently handled and served and make serving more difficult and less efficient.

Other attempts to overcome the noted deficiencies have included the provision of a multiplicity of small ovens in which a small or limited number of meals can be heated. While such attempts have merit as regards the heating of the meals, they have proved to require the use of too much valuable space and the addition of undesirable weight.

Yet other attempts have included the provision of force draft means to circulate hot or heated air in and about the ovens to maintain uniform heat throughout. This means has proved to be of some help or aid, but not wholly effective and truly satisfactory.

An object of this invention is to provide a novel and improved oven structure to effectively, efficiently and uniformly heat a multiplicity of refrigerated prepared meals.

Another object of this invention is to provide an oven structure of the character referred to which is small, light, neat, compact and such that it is particularly suitable for use in aircraft.

Yet another object of the present invention is to provide an oven which is particularly adapted to receive a plurality of dissimilar refrigerated and/or frozen meals in any desired sequential order and to heat said meals substantially uniformly as regards to desirable time and temperature perameters.

It is yet another object and feature of the instant invention to provide an oven of the character referred to wherein the desired mean temperature throughout each area or zone within the oven where food stuff is deposited is subject to independent control.

It is a feature of our invention to provide an oven of the character referred to which includes an insulated cabinet defining an oven chamber, an access door and a plurality of vertically spaced shelves for supporting plates and/or trays of food stuffs and each of which includes a resistance heating element and a heat sensing element to control the flow of current to the heating element thereof.

It is an object and feature of this invention to provide a structure of the character referred to wherein each shelf heats the food supported thereby by conduction and radiation and heats the food supported on a like shelf below it by radiation.

Yet another object and feature of this invention is to provide a structure of the character referred to wherein each heat sensing means is responsive to temperature variations throughout the entire major dimension of the shelf with which it is related.

Still another object and feature of this invention is to provide a structure of the character referred to wherein the several shelves are imperforate whereby the zones of the oven defined thereby are isolated from direct vertical drafts and are spaced from the sides or walls of the oven about their perimeters to afford desired draft for distribution of heat and the conduction of aromatic vapors and the like upwardly and by the several shelves, for discharge from the oven and without contaminating or adversely effecting the foods deposited in the oven.

In connection with the above, it is to be noted that in ordinary ovens, such as described in the preceding, no means is provided to isolate different kinds of food, such as fish and beef, so that the odor and taste of one food will not be transferred to the other foods and adversely effect their aroma and taste. In such ovens, the atmosphere in the upper portions thereof becomes heavily saturated with aromatics from the several different foods being heated and the food therein are adversely effected thereby.

An object and feature of this invention is to provide shelves of the character referred to which are in the nature of electric hot plates of light weight cast aluminum, with a high index of heat conductivity and in which the resistance heating elements are arranged at the time of casting to establish integral parts thereof.

Still another object and feature of this invention is to provide modular, unitary shelves of the character referred to above wherein the heater elements have terminals projecting from one edge of the shelves and the ovens have terminal connecting means in the walls which oppose said edges of the shelves whereby the several shelves can be easily and conveniently engaged in and removed from operating relationship in the oven, as desired and as circumstances require.

The foregoing and other objects and features of our invention will be apparent and will be fully understood from the following detailed description of typical preferred forms and applications of the invention throughout which description reference is made to the accompanying drawings, in which:

FIG. 1 is an isometric view of an oven embodying the present invention, with portions broken away to illustrate details of the construction;

FIG. 2 is a sectional view taken substantially as indicated by line 2—2 on FIG. 1;

FIG. 3 is a sectional view taken substantially as indicated by line 3—3 in FIG. 1;

FIG. 4 is a view taken substantially as indicated by line 4—4 on FIG. 1;

FIG. 5 is a view taken as indicated by line 5—5 on FIG. 4;

FIG. 6 is a view taken as indicated by line 6—6 on FIG. 5;

FIG. 7 is a view taken as indicated by line 7—7 on FIG. 2;

FIG. 8 is a diagramatic view showing a typical electrical circuitry suitable for use in our invention; and, FIG. 9 is an isometric view of another form of our invention.

The oven structure that we provide includes a heat insulated cabinet or housing H having flat, horizontal top and bottom walls 10 and 11, flat vertical side walls 12, a flat vertical rear wall 13 and an open front 14, all of which cooperate to define a forwardly opening chamber C.

The several walls are preferably established of spaced, inner and outer sheet metal skins with a filler of heat insulating material therebetween.

The adjacent edges of the inner and outer skins of the adjacent walls of the housing are integrally joined or connected.

The open front 14 of the cabinet is preferably defined by an outwardly projecting rectangular mounting flange F, the outer portion of which projects outwardly from the outer perimeter of the open front 14 and the inner portion of which is formed integrally with and/or joins the forward edges of the inner skins of the top, bottom and side walls of the cabinet.

The cabinet structure can, if desired further include an exhaust vent opening E in the top wall 10, which vent opening can, in accordance with common practice, be provided with a suitable valve means or damper V.

The oven structure further includes a heat insulated closure of door D pivotally carried by the flange F and manually operable into and out of opened and closed relationship with the open front 14 of the housing and so as to electively permit free access into the chamber C.

The structure thus far described is a typical cook oven construction and is subject to wide variation in detail and design, without in any way effecting or altering the spirit of the present invention.

For the purpose of establishing and carrying out this invention, any basic form or style of oven cabinet or housing having a forwardly opening chamber defined by top, bottom, side and rear walls, which are preferably heat insulated, and which is provided with a closure or door for the open front of the chamber, can be employed to advantage.

In the case illustrated in the drawing, the oven cabinet or housing H is a relatively tall thin or narrow unit suitable for installation in an aircraft or the like, where limitations of space require such a configuration.

The chamber C of the oven is shown divided into two side-by-side chamber sections or sub-chambers X by a central, vertical, metal plate-like partition P. The partition P can, if desired and as shown, be provided with lighting holes or openings 15, which openings also serve to conduct heat from one section or sub-chamber X to the other.

It is to be noted and understood that the chamber C could be considerably wider and could include a plurality of partitions, such as the partition P, or could be narrower, corresponding in lateral extent to but one of the chamber sections X or sub-chambers and in which case no partition would be required or provided.

In light of the above, it will be noted that each chamber section X can, in accordance with the broader aspect of this invention, be considered and looked upon as a separated and independent oven chamber and in which case the partition P establishes or define one of the side walls thereof. Such a consideration or interpretation of the construction is only invalid or wanting when the partition or partitions are provided with lighting openings and consideration is given to the heat transferring function of such openings.

Each chamber section or sub-chamber X of the oven structure is divided into a plurality of vertical zones Z by means of a plurality of vertically spaced horizontal shelves S mounted in the chamber X or chamber section in spaced relationship from or with the several vertical walls or surfaces which define the chamber or chamber section whereby each zone Z is in open communication with each adjacent zone, about the perimeter of the shelves which define said zones.

In the case illustrated, each zone is sufficiently in lateral and vertical extent to freely and conveniently receive and accomodate a plate or tray T with a meal M deposited thereon and is sufficient in depth or longitudinal extent to freely and conveniently receive a desired number of such plates or trays, for example, three (3) plates.

It is significant and important to note that the oven construction that we provide is particularly designed and adapted for use in aircraft and that aircraft are subject to considerable and often times severe movements when in flight. These movements are such that plates or trays of food deposited in the ovens are likely to be shifted and moved about, if not suitably retained. To this end and so as to prevent excessive and undesirable shifting of the plates and/or trays of food in the oven that we provide, the zones Z are of limited lateral extent so as to receive but one plate or tray in that dimension and so that the side walls and/or partitions which define each zone, serve as stops to prevent excessive lateral shifting of the plates and/or trays and displacement thereof from the shelves upon which they are supported.

It has been determined that if the shelves and/or zones are of limited longitudinal extent or depth and capable of receiving and supporting but three or four plates and/or trays and said plates and/or trays are adequately restrained against excessive lateral movement, excessive longitudinal movement and shifting of the plates and/or trays will not occur as a result of normal movement of the aircraft.

The longitudinal extent or depth of each zone Z is, to a great extent, governed or controlled by the accessibility to the rear portion of each zone which must be provided to enable a person to easily and conveniently reach and engage a plate or tray arranged in the rear portion thereof to effect its withdrawal.

Each shelf S is, in the preferred form of the invention, a flat, horizontal, rectangular metal plate with a flat, horizontal upwardly disposed, imperforate top surface 40, a bottom surface 41, straight, laterally extending parallel front and rear end edges 42 and 43 and straight, longitudinally extending, parallel side edges 44.

In practice, it is preferred that the shelves be established of a light metal having a high index of heat conductivity and to this end are preferably cast of aluminum.

The shelves S are three or more time longer than they are wide and each is provided with one or more electric resistance heater element E, which elements are, substantially, coextensive with the longitudinal extent of the shelves.

The heater elements E are preferably arranged within the shelves at the time they are cast and establish an integral part of each shelf structure.

The heat elements E have rear ends 45 which project from and are accessible at the rear ends 43 of their related shelves.

The terminal rear ends of the heaters can, as illustrated, be provided with orienting flanges 45 and carry members or parts of suitable electrical connector means J for the element. In the case illustrated, the means J are jack-type connector means and the rear ends of the elements carry the male members 46 of said means, which members are normally engaged in the female members 47 are suitable engaged through and carried by the rear wall of the oven structure and connect with a suitable power supply C.

In the case illustrated, each shelf is shown provided with three, straight, laterally spaced, parallel heater elements E. The three elements E are of such longitudinal extent and are spaced in such a manner, with respect to the heat conducting characteristics of the shelf, so that when the heaters are energized, the shelf is heated rapidly and substantially uniformly throughout its entire extent.

In addition to the above, each shelf S is provided with an elongate, longitudinally extending heat sensing element F, which element is responsive to changes or variations in the overall temperature of the shelf and changes in the temperature of the shelf at any point along the longitudinal extent thereof.

The element F of each shelf, like the heater elements E, is arranged within the shelf to extend longitudinally thereof and in spaced relationship from the heater elements.

In practice, the element F can be arranged to occur centrally of the shelf or along any suitable line spaced laterally from the center axis of the shelf. In the case illustrated, the element F is shown arranged in and extending longitudinally of one side of the shelf.

The element F, like the elements E, has a rear end projecting from and accessible at the rear end of the shelf and can, as shown, be provided with the male member 46' of a jack-type connecting means J' which member is engagable with the female member 47' of said connector means, carried by the rear wall of the oven structure.

In practice, the element F consists of a metal tube 48 arranged in the shelf when it is cast and an elongate temperature responsive probe 49 which is slidably engaged in the tube 48, from its open rear end, after the shelf is cast.

The element F of each shelf is suitable connected in and with the power supply G for the elements E of that shelf by suitable control means K and cooperates with the means K to effect energizing and de-energizing of the elements E to maintain the temperature of the shelf within a predetermined and set range.

In practice, the control means K related to each shelf S can be connected with a single and common manually operable temperature setting means L accessible at the front of the oven structure. The setting means L is such that the operator of the oven can easily and conveniently adjust and set the construction so that it will heat to any desired temperature, throughout the operating temperature range of the construction.

Since the exact nature and construction of the elements E and F and the exact nature and construction of the means K and L can vary widely without departing from the spirit of this invention, these elements and means have been illustrated and described in a diagramatic and/or generic manner and detailed illustration and description thereof will be dispensed with.

It will be readily apparent that each of the elements E and F and the means K and L of this invention are common, commercially available elements and means and that any one skilled in that art could, without the exercise of invention or special or extraordinary skill, select appropriate and suitable heater and senser elements and appropriate and suitable control and setting means, from the multitude of such elements and means which are commercially available, and could establish and put the instant invention into practice.

It is to be noted and understood that the jack-type connecting means J and J' that we have illustrated and described are desirable since they make assembly and service of the construction simple and convenient. In practice, however, any suitable and other connecting means can be employed instead of the noted jack-type means without departing from the spirit of this invention.

In addition to the foregoing, the structure that we provide includes suitable mounting means N for mounting the shelves S in the oven chamber or chambers. The mounting means N is shown as including laterally outwardly projecting rectangular mounting tabs 50 at the front and rear ends of each side 44 of each shelf. Each tab is provided with a downwardly and laterally opening recess 51.

The means N next includes vertically spaced front and rear mounting brackets 52 at the front and rear portions of the side walls and/or partitions defining the chambers or sub-chambers and having laterally inwardly projecting support ears 53 which ears cooperatively enter and establish seated engagement in the recesses 51 of the mounting tabs 50 related thereto.

The brackets 52 can, as shown, be established of short pieces of angle stock, riveted, spot welded or otherwise fixed to their related walls and/or partitions.

In FIG. 8 of the drawings, the oven cabinet H' is shown as a narrow unit equal in width with one shelf S'.

The shelf S' is shown as being supported, along its side edge portion 44' on rails 52' formed in the side walls 12' of the cabinet and as having a single U-shaped element E' arranged within it. The rear ends of the element E' are accessible at the rear end 43' of the shelf and connect with a power supply by means of connector means J".

The shelf S' next includes a heat sensing element F' extending longitudinally and centrally of the shelf, between the legs of the U-shaped heating element and is related to connecting means J$^b$ at the rear end of the shelf.

Finally, the shelf S' is provided with a plurality of vertically opening draft openings 60 at and along its opposite side portions.

In all other respects, the structure shown in FIG. 8 is essentially the same as and embodies the same invention as the structure shown in FIGS. 1 through 7 of the drawings.

With the structure provided by our invention, it will be apparent each shelf S is a flat, horizontal heat sink and transfer element or part supported freely within the oven cabinet and defines the upper and/or lower sides or planes of the zone Z related thereto and defined thereby. Each shelf S absorbs and conducts the heat generated by the heating elements E embodied within it, throughout its entire extent and under control of the element F, whereby the shelf is maintained at a substantially uniform predetermined, set temperature.

The temperature in each zone Z is maintained at the set temperature by conductive and radiant heat from the upper and the lower shelves which define the zone and by conduction of heat about the perimeters of the shelves and through the heat conducting openings about the shelves and/or defined by the spaces between the vertical walls of the cabinet and the spaced opposing sides of the shelves. It will be apparent that any differential in the ambient temperature of the atmosphere in the several zones Z of the oven structure results in present and effective convection flow in and between the zones which rapidly establishes and maintains the temperature of the atmosphere in the several zones extremely near to and from a practical standpoint at the predetermined set operating temperature of the oven.

When a cold plate P of prepared food is placed on a shelf S for heating, heat from that shelf is conducted directly to the plate and thence into the food where contact is established between the plate and shelf. The remainder of the plate and the food is heated by radiant heat from that shelf and the next upper shelf and by conduction of heat from the heated ambient atmosphere or air in the zone defined by the shelves and in which the plate and food is deposited. The heat absorbed by the plate and food from the supporting shelf and by the atmosphere of the zone, which absorbs heat from both the supporting and overlying shelves, lowers the temperature of the shelves, which drop in temperature is sensed by the element F and results in energizing of the elements in the shelves to replace the heat thus drawn from said shelves.

When one, two or more plates of food are arranged and placed on two or more of the shelves of the oven, the oven structure operates to heat plates of food arranged in each zone in the same manner as it does to heat a single plate of food, as above described and all of the plates of food arranged or deposited in the oven are heated uniformly and at a rate which, from all practical standpoints, is uniform.

It is extremely important to note that with the structure that we provide the temperature of the several shelves and the zones of the oven defined thereby are responsive to the elements F of each shelf and of the shelves which define each zone whereby the temperature of each shelf is independently controlled by the element F thereof and the temperature of each zone is controlled by the elements F of the shelves at its upper and lower extremities.

As a result of the above, when cold plates of food are placed in the oven and the temperature in the oven is caused to drop in each shelf and in each zone, and a demand for more heat is established, each shelf is heated and each zone is heated in response to such demand. With such a combination of parts and rule of action, the maximum temperature to which each shelf is heated can be and is maintained relatively low and is not subject to being elevated to an extreme temperature for extended periods of time and in such a manner that would result in premature heating, dehydration and burning of food in close proximity thereto.

In practice, if it is desired that the meals or food to be heated, be heated to 200° F., the temperature control means for the several shelves is set for 200° F. and the elements E of the shelves are energized on demand, to maintain the shelves at that set temperature. At no time does the temperature of a shelf throughout any appreciable area thereof exceed, for example, 300° F. and for a period of time that will result in drying, scorching or burning of food in the oven.

The above distinguishes from conventional oven structures wherein widely spaced heating elements (independent of heat radiating and distributing plates or the like) are heated to extreme temperatures, for protracted periods of time to heat portions of the oven remote therefrom and which inevitably results in dehydration and/or burning of food and in ununiform cooking and/or heating of food.

Having described typical preferred forms and applications of our invention, we do not wish to restricted to the details herein set forth, but wish to reserve to ourselves any modifications and variations that appear to those skilled in the art and which fall within the scope of the following claims.

Having described our invention, we claim:

1. An oven structure comprising a forwardly opening heat insulated cabinet with top, bottom, rear and side walls and an access door normally overlying its front, a plurality of flat, substantially rectangular, horizontal support shelves arranged in the cabinet in vertical spaced relationship and defining vertically spaced forwardly opening zones to receive food to be heated, each shelf having electric resistance heating means throughout its planar extent and an elongate heat sensing element in and responsive to the temperature of the shelf, power supply means for the resistance heating means of the shelves and connected with and controlled by the heat sensing element of each shelf, said shelves are established of metal having a high index of heat conductivity and having flat top supporting surfaces, said heating means including elongate resistance heating elements arranged in and carried by the shelves and having ends with electrical connecting parts at a side of the shelves and connected with complimentary electrical connecting parts carried by the wall of the cabinet adjacent said side of the shelves, said structure further includes vertical extending heat conducting openings at sides of the shelves and establishing communication between related side portions of adjacent zones.

2. A structure as set forth in claim 1 wherein said heat sensing elements are arranged in and carried by the shelves in spaced relationship with the heating elements.

3. A structure as set forth in claim 1 wherein said heat sensing means and heating means include elongate metal jacketed elements arranged in and carried by the shelves in spaced substantially parallel relationship with each other.

4. An oven structure comprising a forwardly opening heat insulated cabinet with top, bottom, rear and side walls and an access door normally overlying its front, a plurality of flat, substantially rectangular, horizontal support shelves arranged in the cabinet in vertical spaced relationship and defining vertically spaced forwardly opening zones to receive food to be heated, each shelf having electric resistance heating means throughout its planar extent and an elongate heat sensing element in and responsive to the temperature of the shelf, power supply means for the resistance heating means of the shelves and connected with and controlled by the heat sensing element of each shelf, said shelves are established of metal having a high index of heat conductivity and having flat top supporting surfaces, said heating means including elongate resistance heating elements arranged in and carried by the shelves and having ends with electrical connecting parts at a side of the shelves and connected with complimentary electrical connecting parts carried by the wall of the cabinet adjacent said side of the shelves, said structure further including vertical extending heat conducting openings at sides of the shelves and establishing communication between related side portions of adjacent zones, said heat sensing means including elongate heat sensing elements arranged in and carried by the shelves in spaced parallel relationship with the heating elements, said heating and heat sensing elements being elongate metal jacketed elements, said shelves being cast metal parts, cast about said elements.

5. A structure as set forth in claim 4 wherein said elements have electrical connecting parts at one edge of their related shelves and connected with complementary electrical connecting parts carried by the wall of the cabinet adjacent said one edge of the shelves.

6. A structure as set forth in claim 5 wherein said one edge of the shelves is the rear edge thereof, said adjacent wall is the rear wall and said electrical connecting parts are inter-engageable male and female parts.

* * * * *